United States Patent
Okayama et al.

(10) Patent No.: US 7,345,379 B2
(45) Date of Patent: Mar. 18, 2008

(54) POWER CONVERTER WITH VOLTAGE AND CURRENT FAULT SETTING

(75) Inventors: Hideo Okayama, Tokyo (JP); Toshiyuki Fujii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 571 days.

(21) Appl. No.: 10/998,835

(22) Filed: Nov. 30, 2004

(65) Prior Publication Data

US 2005/0141157 A1 Jun. 30, 2005

(30) Foreign Application Priority Data

Dec. 25, 2003 (JP) ............... 2003-428527

(51) Int. Cl.
- H02H 3/38 (2006.01)
- H02J 4/00 (2006.01)
- H02M 11/00 (2006.01)
- H02M 3/00 (2006.01)

(52) U.S. Cl. .................. 307/45; 307/103; 361/79; 323/207

(58) Field of Classification Search .......... 361/18, 361/79, 88, 90, 92, 93.2; 307/45, 46, 47, 307/103, 125, 130, 131; 363/55; 323/207

See application file for complete search history.

(56) References Cited

U.S. PATENT DOCUMENTS

| 5,329,222 | A |   | 7/1994  | Gyugyi et al.          |
|-----------|---|---|---------|------------------------|
| 5,991,181 | A | * | 11/1999 | Fujii et al. ..... 363/97 |
| 6,118,676 | A | * | 9/2000  | Divan et al. ..... 363/34 |
| 6,242,895 | B1| * | 6/2001  | Fujii et al. ..... 323/207 |
| 6,531,854 | B2| * | 3/2003  | Hwang ..... 323/285    |

FOREIGN PATENT DOCUMENTS

| JP | 4-117135 | 4/1992 |
|----|----------|--------|
| JP | 11-41812 | 2/1999 |

* cited by examiner

Primary Examiner—Michael Sherry
Assistant Examiner—Andrew Deschere
(74) Attorney, Agent, or Firm—Oblon, Spivak, McClelland, Maier & Neustadt, P.C.

(57) ABSTRACT

A power converter includes a steady-state controller for outputting a first voltage command such that a detected power value matches a power command, a transient controller for outputting a second voltage command such that a voltage detected before the occurrence of a fault is maintained when the fault occurs, and a voltage command selector for switching the voltage command in such a way that the first voltage command is output when no power fault is detected and the sum of the first and second voltage commands is output when any power fault is detected.

8 Claims, 11 Drawing Sheets

POWER CONVERTER WITH VOLTAGE AND CURRENT FAULT SETTING

BACKGROUND OF THE INVENTION

1. Field of the Invention

The present invention relates to a power converter employing, for example, a self-arc-extinguishing semiconductor device and, more particularly, pertains to a power converter which may be referred to as a multimode static series compensator, provided with such functions as reactive power compensation, voltage regulation and power system fault protection.

2. Description of the Background Art

Consumers of electric power often connect capacitors for power factor improvement to their loads to reduce contract charges for electricity by improving the power factor at receiving ends. Most of the loads of each consumer contain a reactor of which presence causes a lagging power factor. This is why the power factor can be improved by inserting capacitors which serve to produce a leading power factor.

If a consumer stops operating a load to which a capacitor for power factor improvement is connected, however, the capacitor itself acts equivalently as a load for a utility power system. Consequently, there arises a need for an electrical power company to supply leading reactive power to the equivalent phase-advancing capacitive load from a generator.

One of measures that the electrical power company can take to overcome this problem is to introduce a var compensator like the one shown in FIG. 8 of Japanese Laid-open Patent Application No. 1999-41812, for instance. The var compensator includes a power conversion circuit capable of producing reactive power required. The var compensator can generate either leading reactive power or lagging reactive power. Thus, the electrical power company causes the var compensator to generate the leading reactive power when the consumer operates the load and to generate the lagging reactive power when the load is not operated so that the reactive power to be generated by the generator is suppressed.

Some consumers have sensitive loads and there are cases where the loads are run at reduced operation rates depending on the quality of received utility voltage. A consumer running a semiconductor production line, for example, has a problem that, if the received voltage fluctuates, the production line would totally shut down. In particular, such a consumer would incur substantial losses if an instantaneous voltage drop occurs due to a power system fault.

One of conventional measures that a consumer can take to cope with such voltage fluctuations would be to introduce an uninterruptible power supply like the one shown in FIG. 1 of Japanese Laid-open Patent Application No. 1992-117135, for instance. The uninterruptible power supply directly supplies power fed from the utility power system to a load under normal conditions. If a voltage fluctuation occurs in the utility power system, the uninterruptible power supply disconnects the load from the utility power system by operating a switch and supplies electric power from a built-in battery to the load through a power conversion circuit.

Another conventionally known apparatus usable for coping with voltage fluctuations is a dynamic voltage restorer (DVR) shown in FIG. 1A of U.S. Pat. No. 5,329,222 which compensates for fluctuations in utility supply voltage caused by a system fault, for instance, without disconnecting the load from the utility power system unlike the aforementioned uninterruptible power supply. The DVR corrects for deviations in the utility supply voltage caused by line disturbances by regulating output voltage of a transformer of which primary winding is series-connected to a utility transmission line by means of a power conversion unit.

The aforementioned var compensator can suppress the reactive power to be generated by the generator by a reactive power compensating function, enabling the electrical power company to reduce power transmission cost. However, the var compensator does not work as an uninterruptible power supply which is needed by consumers. This means that the var compensator can not compensate for voltage drops or sags caused by a system fault, for instance.

On the other hand, the conventional uninterruptible power supply can supply voltage to a load even in the event of an instantaneous drop of the utility supply voltage upon disconnecting the load from a faulty power system by means of a high-speed circuit breaker or a thyristor switch. In principle, the uninterruptible power supply must provide full power required by the load in the event of a power system failure to compensate for any kind of instantaneous voltage deviations. Specifically, the uninterruptible power supply is required to provide a 100% voltage whether the voltage drop is 10% or 50% of a fully rated utility supply voltage. For this reason, it is necessary for the uninterruptible power supply to incorporate a power conversion circuit and a battery having large capacities, resulting in a high cost of the uninterruptible power supply.

In the DVR of U.S. Pat. No. 5,329,222, the transformer series-connected to a utility power system is held in a short-circuited state by the power conversion unit as long as no deviations or fluctuations exist in the utility supply voltage. Consequently, as long as the utility supply voltage is maintained at a rated level, the transformer and the power conversion unit connected to a secondary winding of the transformer remain in a standby state until a system fault occurs, while causing energy losses. The value of a current flowing through the power conversion unit is equal to a value obtained by multiplying a power line current by the turns ratio of the transformer which is set to a value larger than 1, so that the current flowing through the power conversion unit has a large value. Therefore, a large energy loss occurs in a network connected to the secondary winding of the transformer.

SUMMARY OF THE INVENTION

The present invention is intended to solve the aforementioned problems of the prior art. Accordingly, it is an object of the invention to provide a power converter incorporating multiple functions, such as a reactive power compensating function and an uninterruptible power supply function, which make it possible to satisfy demands of both electrical power companies and consumers at low cost and low energy losses.

A power converter of the invention includes first and second terminals, a power conversion circuit, first and second voltage sensors, a current sensor, a fault sensor, a first controller, a second controller and a voltage command selector. The first and second terminals are connected in series with a power line of a power system as if inserted therein. The power conversion circuit outputs a voltage applied between the first and second terminals by converting power fed from an energy storage circuit. The first and second voltage sensors detects voltages at the first and second terminals, respectively. The current sensor detects a current flowing from the first terminal to the second terminal. The fault sensor detects the presence or absence of any voltage fluctuation fault at either of the first and second terminals based on sensing signals of the first and second voltage sensors and the current sensor. The first controller outputs a first voltage command for controlling the output voltage of the power conversion circuit such that a detected power value calculated from the sensing signals of the first and second voltage sensors and the current sensor matches a specific power command. The second controller outputs a second voltage command for controlling the output voltage of the power conversion circuit such that the voltage detected by one of the first and second voltage sensors remains the same as before the occurrence of a fault if the fault sensor detects the presence of the fault. The voltage command selector switches the voltage command to be output to the power conversion circuit in such a way that the first voltage command is output to the power conversion circuit if the fault sensor detects the absence of the fault and the sum of the first and second voltage commands is output to the power conversion circuit if the fault sensor detects the presence of the fault.

The power converter thus configured serves a function of controlling power to a constant level under steady-state operating conditions in which no anomaly exists in the power system. Under transient conditions following the occurrence of an anomaly in the power system, on the other hand, the power converter serves the function of controlling the power to a constant level as well as a function of suppressing voltage fluctuations at a point where the voltage should be compensated for, so that the single power converter of the invention can perform both functions at low cost and low energy losses.

These and other objects, features and advantages of the invention will become more apparent upon reading the following detailed description along with the accompanying drawings.

DESCRIPTION OF THE PREFERRED EMBODIMENTS

First Embodiment

A first embodiment of the present invention is now described with reference to FIGS. 1 and 2, which are block diagrams of multimode static series compensators serving as power converters according to the first embodiment and a variation thereof.

Figure 1:
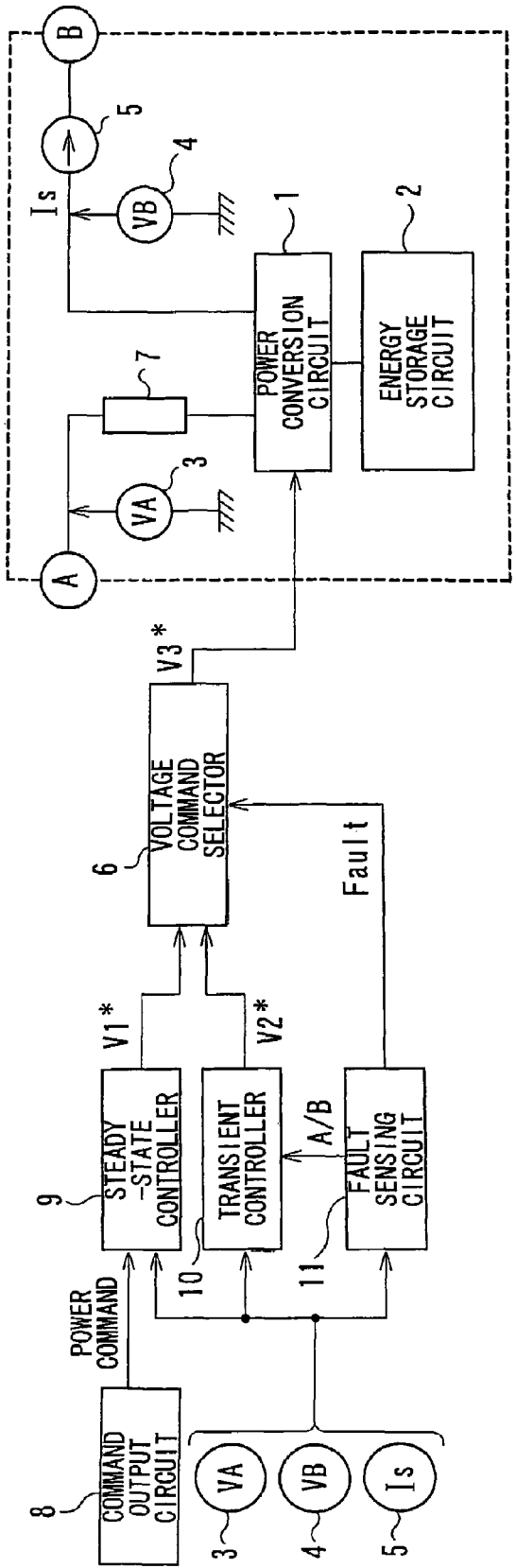
FIG. 1 is a block diagram of a multimode static series compensator according to a first embodiment of the invention.

A main circuit portion enclosed by broken lines in FIG. 1 is configured as follows. This main circuit portion includes a power conversion circuit 1 which is series-connected to a first terminal A and a second terminal B for outputting a voltage thereto, the first and second terminals A, B being connected to a power system or to a load. Connected to an energy storage circuit 2, the power conversion circuit 1 outputs the voltage by using energy stored in the energy storage circuit 2. The first terminal A and the second terminal B are associated with a first voltage sensor 3 and a second voltage sensor 4, respectively. The main circuit portion further includes a current sensor 5 for detecting the value of a current (instantaneous value), or power line current Is, flowing between the first and second terminals A, B.

The power conversion circuit 1 outputs the voltage applied between the first and second terminals A, B according to a third voltage command V3* (instantaneous value) which is an output of a voltage command selector 6. A fault sensing inductance 7 provided in the main circuit portion will be later described in detail with reference to a sixth embodiment of the invention.

A control circuit portion not enclosed by the broken lines in FIG. 1 is configured as follows. A power command output from a command output circuit 8 is fed into a steady-state controller 9 which serves as a first controller for mainly performing a reactive power compensation control operation. Outputs of the first and second voltage sensors 3, 4 and the current sensor 5 are fed into the steady-state controller 9 and a transient controller 10 which serves as a second controller.

The steady-state controller 9 calculates required reactive power and delivers a first voltage command V1* (instantaneous value) to the voltage command selector 6 for outputting a voltage of which phase is advanced or delayed by 90 degrees with respect to the phase of the power line current Is. On the other hand, the transient controller 10 calculates a voltage for compensating for voltage fluctuations at the first terminal A or at the second terminal B and delivers this voltage to the voltage command selector 6 as a second voltage command V2* (instantaneous value).

A fault sensing circuit 11 examines whether any fault has occurred, determines the location of the fault (whether the fault has occurred on the terminal A or B side), if any, and outputs relevant fault information. A configuration for determining the location of the fault will be later discussed specifically with reference to the sixth embodiment.

Depending particularly on the result of judgment as to whether a voltage fluctuation has occurred on the side of the first terminal A or the second terminal B, the transient controller 10 can correctly calculate the second voltage command V2* without any polarity error. If a signal indicating that a voltage correction is necessary, or information indicating that a fault has occurred, is input, the voltage command selector 6 switches the value of the third voltage command V3*, which is a voltage command value for the power conversion circuit 1, from the first voltage command V1* input before the occurrence of the fault to a value obtained by adding the first voltage command V1* and the second voltage command V2* input after the occurrence of the fault.

When the fault has been eliminated, the fault sensing circuit 11 naturally judges that the voltage correction is no longer necessary. In this case, the voltage command selector 6 switches the value of the third voltage command V3* from the value obtained by adding the first voltage command V1* and the second voltage command V2* input before the elimination of the fault to the first voltage command V1* input after the elimination of the fault.

Figure 2:
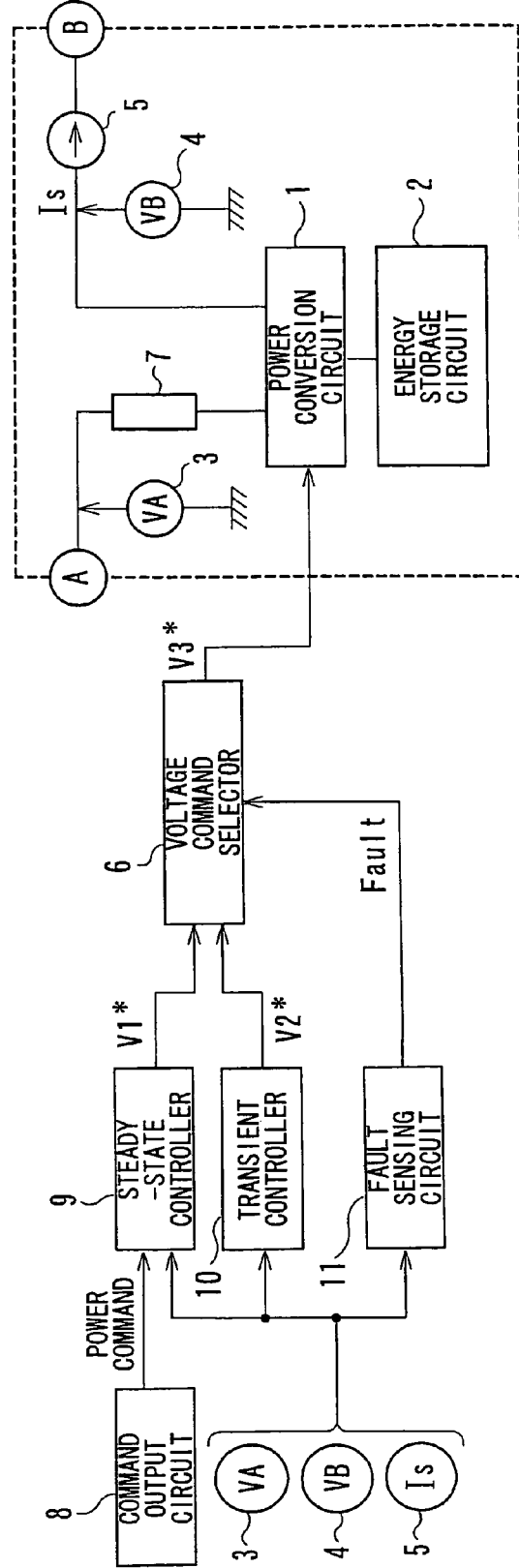
FIG. 2 is a block diagram of a multimode static series compensator according to a variation of the first embodiment of FIG. 1.

While the first embodiment of FIG. 1 employs a configuration used when it is necessary to determine whether the location of the fault is on the side of the first terminal A or the second terminal B, FIG. 2 shows a configuration used when it is not necessary to determine the location of the fault. The configuration of FIG. 2 is otherwise the same as the configuration of FIG. 1.

The power conversion circuit 1 shown in FIGS. 1 and 2 may be of any type as long as the power conversion circuit 1 can apply a voltage between the first and second terminals A, B by using the energy stored in the energy storage circuit 2. A candidate for the power conversion circuit 1 is an inverter circuit including a power semiconductor device for converting direct current (dc) into alternating current (ac), for example.

Means that can be used as the energy storage circuit 2 shown in FIGS. 1 and 2 include a battery, a capacitor and a superconducting magnetic energy storage (SMES) system. A flywheel for storing rotary (kinetic) energy is also usable as the energy storage circuit 2.

While the foregoing discussion of the first embodiment has been limited to single-phase circuit configurations shown in FIGS. 1 and 2, it is needless to mention that the first embodiment is applicable to a three-phase circuit configuration as well. A detailed description of the three-phase circuit configuration is not provided as the same can be easily devised by one skilled in the art, although minor changes should be made in the design of means for detecting phases and the amplitude of current.

Second Embodiment

Figure 3:
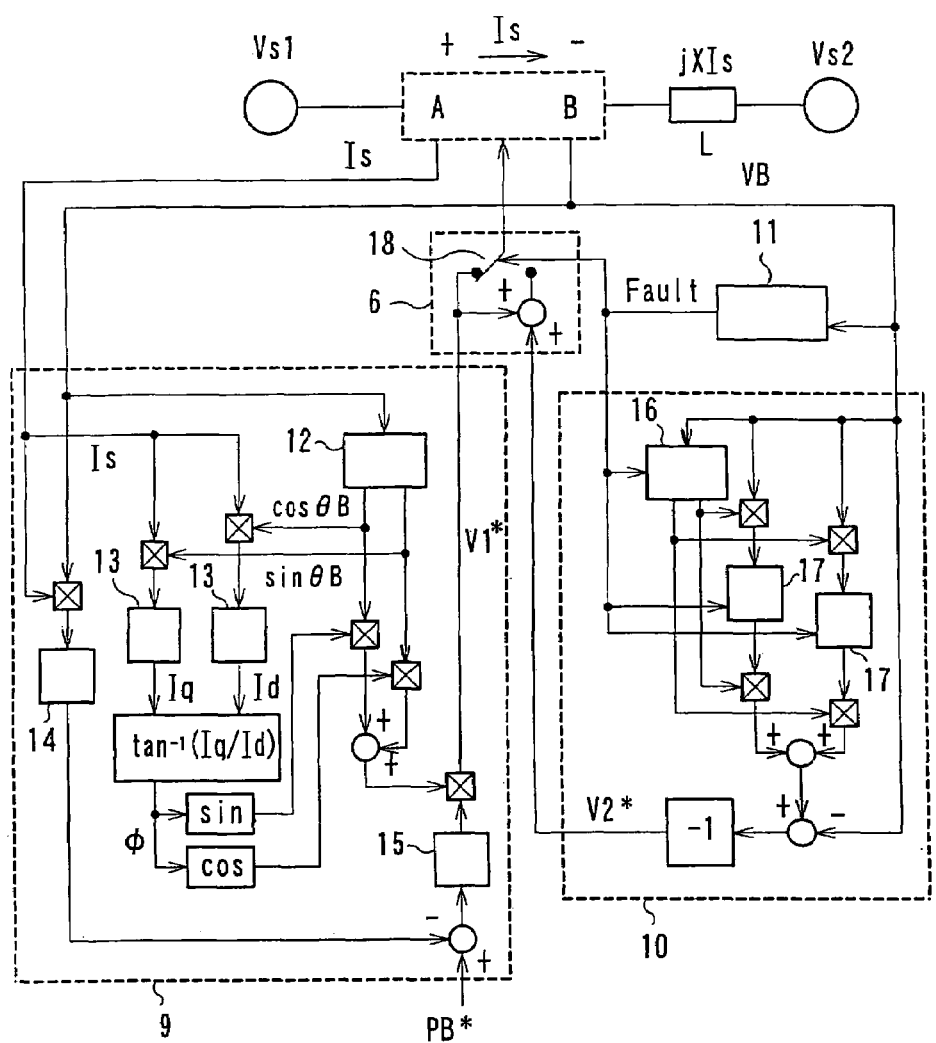
FIG. 3 is a block diagram of a multimode static series compensator according to a second embodiment of the invention.

FIG. 3 is a block diagram of a multimode static series compensator according to a second embodiment of the invention.

This multimode static series compensator is configured such that the same is connected between two ac power supplies Vs1, Vs2 (first and second power supplies) and injects a voltage therebetween. Referring to FIG. 3, there exists impedance X of a transmission line and a transformer, for instance, between the multimode static series compensator and the ac power supply Vs2. While the impedance X exists between the multimode static series compensator and the ac power supply Vs2 alone as illustrated in FIG. 3, the following discussion applies, in principle, even when similar impedance also exists between the multimode static series compensator and the ac power supply Vs1.

Figure 4A:
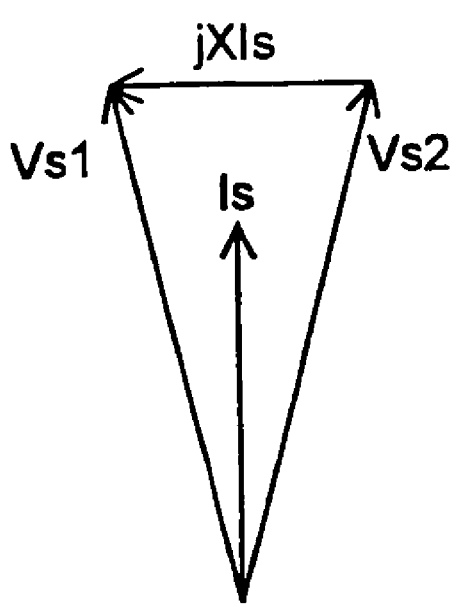
FIGS. 4A, 4B and 4C are diagrams showing voltage and current vectors depicting the operation of the multimode static series compensator of FIG. 3.

FIG. 4A is a vector diagram showing a state in which the multimode static series compensator operates while producing zero voltage. Current Is (vector) which flows between the two ac power supplies Vs1, Vs2 in this state is determined by a voltage applied across the impedance X and the amount of the impedance X. As a main component of the impedance X of the transmission line and the transformer is reactance, a current of which vector representation is given by Is=(Vs1−Vs2)/jX flows due to voltages Vs1, Vs2 (vectors) of the two power supplies and the reactance X.

Figure 4B:
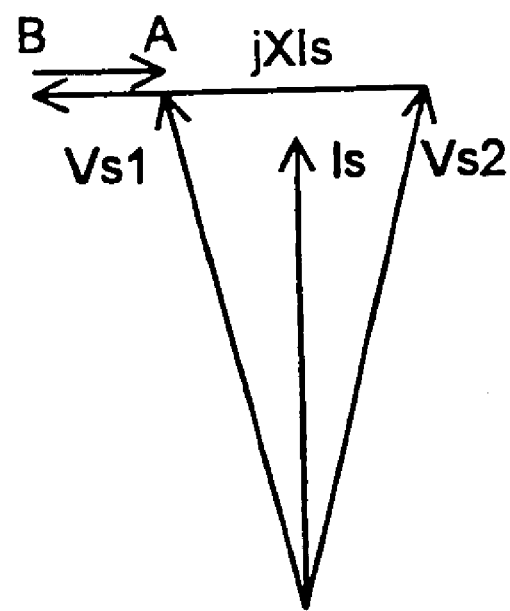

FIG. 4B is a vector diagram showing a state in which the multimode static series compensator applies a voltage delayed by 90 electrical degrees from the current Is in the state of FIG. 4A. Since no impedance X exists on the side of a first terminal A, the voltage at the first terminal A is equal to the voltage Vs1. However, the voltage at a second terminal B differs from the voltage Vs2 by as much as a voltage injected by the multimode static series compensator. Therefore, a voltage difference between the voltage at the second terminal B and the voltage Vs2 is applied across the impedance X. As a result, a voltage higher than applied in FIG. 4A is applied across the impedance X and the amount of current flowing between the two power supplies increases. If the multimode static series compensator injects a voltage which leads the current Is, on the contrary, the voltage applied across the impedance X decreases and, as a consequence, the amount of current flowing between the two power supplies decreases. With this operation of the multimode static series compensator, the current flowing between the two power supplies varies and power flow is regulated.

A steady-state controller 9 of FIG. 3 represents an example of the configuration of a controller capable of executing the aforementioned operation of the multimode static series compensator. Voltage VB (instantaneous value) at the second terminal B detected by a voltage sensor 4 is input into a phase-locked loop 12. The phase-locked loop 12 detects a phase θB synchronized with the voltage VB and outputs sine and cosine components of the phase θB. The specific configuration and operation of the phase-locked loop 12 are not discussed here, since a detailed description of the same is given in Electrical Engineering Handbook, 6th Edition (Section 9, Chapter 9, pages 432-434) published Feb. 20, 2001 by the Institute of Electrical Engineers of Japan. In the phase-locked loop 12, offset for achieving phase synchronization with the voltage VB can be arbitrarily selected. In this embodiment, an offset point is where zero points of the cosine wave of the phase θB synchronize with zero points of the voltage VB.

After multiplying the sine and cosine of the phase θB by the value of a current flowing from the first terminal A to the second terminal B of the multimode static series compensator detected by a current sensor 5, the steady-state controller 9 calculates a sine component Iq and a cosine component Id of the current Is by means of low-pass filters 13. Next, the steady-state controller 9 calculates a phase difference φ of the current with respect to the phase θB from the sine component Iq and the cosine component Id of the current Is. Further, the steady-state controller 9 calculates the sine of θB+φ from the sine and cosine of the phase difference φ and the sine and cosine of the phase θB.

In short, the steady-state controller 9 performs a mathematical operation expressed by sin(θB+φ)=sin(θB)cos(φ)+cos(θB)sin(φ) by means of multipliers and an adder. Derived from this mathematical operation is a reference signal sin(θB+φ) which lags the current Is by 90 electrical degrees. After multiplying the detected voltage VB by the current Is by a multiplier, the steady-state controller 9 detects active power PB flowing through the second terminal B by means of a low-pass filter 14.

The steady-state controller 9 calculates a deviation of the active power PB from an active power command PB* which corresponds to the output of the command output circuit 8 and amplifies the deviation by means of a compensator 15. Then, the steady-state controller 9 generates a first voltage command V1* by multiplying the amplified deviation by the reference signal $\sin(\theta B+\phi)$ which lags the current Is by 90 electrical degrees by means of a multiplier. If the active power PB flowing through the second terminal B is smaller than the active power command PB*, the deviation is positive. In this case, the steady-state controller 9 generates the first voltage command V1* which lags the current Is by 90 electrical degrees, and a power conversion circuit 1 operating in accordance with this voltage command V1* injects a voltage applied between the first and second terminals A, B.

As a consequence, the current Is increases, causing the active power PB to increase and its deviation to decrease, as shown in the vector diagram of FIG. 4B. Conversely, if the deviation is negative, the steady-state controller 9 generates the first voltage command V1* such that the power conversion circuit 1 injects a voltage which leads the current Is by 90 electrical degrees. In this case, the current Is decreases, causing the deviation of the active power PB to decrease.

Now, a transient controller 10 of the multimode static series compensator of this embodiment is described. Like the steady-state controller 9, the transient controller 10 calculates from the detected voltage VB the sine and cosine of a phase synchronized with the voltage VB that is detected by a phase-locked loop 16. However, when a fault sensing circuit 11 detects a voltage drop and outputs a fault signal indicating the occurrence of a fault, the transient controller 10 causes self-excitation of the phase-locked loop 16 so that the phase-locked loop 16 continues to produce the phase synchronized with the same voltage as observed before the occurrence of the fault. The transient controller 10 multiplies the sine and cosine of this phase by the voltage VB by means of multipliers, which deliver the results to respective low-pass filters 17 having a hold function. While these low-pass filters 17 calculate the sine and cosine components of the voltage VB prior to the occurrence of the fault, the low-pass filters 17 hold their outputs with the aid of the hold function when the fault signal indicating the occurrence of a power fault is entered.

The outputs of the low-pass filters 17 do not vary instantaneously, by their very nature, even when the voltage VB drops due to a fault. When the hold function is activated, the low-pass filters 17 maintain the voltage components detected before the occurrence of the fault. If the low-pass filters 17 have a time constant equal to or larger than the period of the ac voltage and the fault sensing circuit 11 detects a fault in about one-quarter of the period of the ac voltage, for example, almost no changes occur in the outputs of the low-pass filters 17. The sine and cosine components held by the low-pass filters 17 are multiplied by the sine and cosine of the voltage phase produced by self-excitation of the phase-locked loop 16, respectively, and the resultant two products are added by an adder. The resultant output of the adder generates an ac signal having almost the same amplitude and phase as the ac voltage observed before the occurrence of the fault. A subtracter calculates a voltage deviation by subtracting the voltage VB from the output of the adder. In the multimode static series compensator of this embodiment, the first terminal A is a positive voltage side. The voltage deviation reversed in polarity is delivered to a voltage command selector 6 as a second voltage command V2* which is applied between the first and second terminals A, B. With this operation of the transient controller 10, the multimode static series compensator corrects for changes in the delivered voltage to maintain the voltage at the second terminal B even when an ac power system fault occurs on the side of the first terminal A. The multimode static series compensator protects ac-operated equipment connected to the second terminal B from the influence of ac power system faults occurring on the side of the first terminal A by maintaining a high-quality load side voltage in the aforementioned fashion.

A specific method of detecting voltage drops applicable to the fault sensing circuit 11 is not discussed here since the same is conventional as disclosed in Japanese Patent No. 2581735, for instance.

Now, the voltage command selector 6 of this embodiment is described. While a normal utility supply voltage is maintained, the output of the fault sensing circuit 11 indicates that there is no fault and, in this case, a selector switch 18 provided in the voltage command selector 6 is set such that the first voltage command V1* is sent to the power conversion circuit 1 as a third voltage command V3*. When the fault sensing circuit 11 outputs the fault signal indicating the occurrence of a fault, the voltage command selector 6 is set to select an opposite-side input such that a signal V1*+V2* is sent to the power conversion circuit 1 as the third voltage command V3*.

The multimode static series compensator of the embodiment performs a power flow control operation under normal operating conditions and simultaneously performs the power flow control operation and a compensation operation for compensating for voltage fluctuations (mainly voltage drops) in the event of a fault in the aforementioned manner.

Figure 4C:
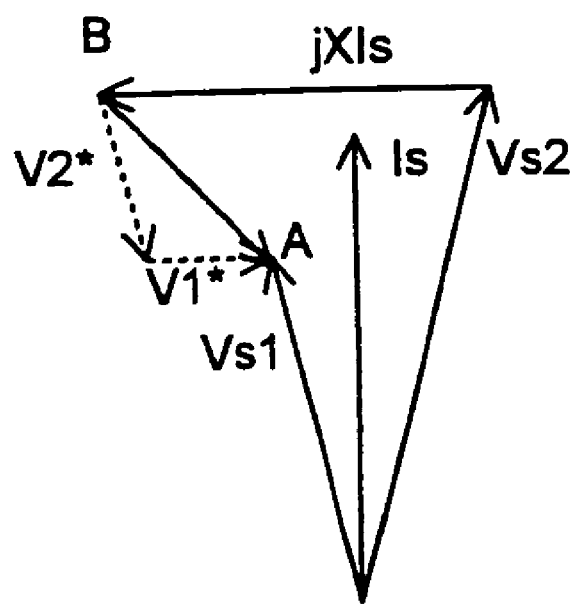

FIG. 4C is a vector diagram showing a state in which the ac supply voltage at the first terminal A has dropped. The multimode static series compensator controls power supplied to a load in such a manner that the supplied power would not fluctuate in the event of a power system fault. When a power system fault occurs, the vector representing the first voltage command V1* remains almost same as before the occurrence of the fault. The second voltage command V2* corresponding to a voltage drop is added to the first voltage command V1* and the sum of the first and second voltage commands V1*+V2* is injected between the first and second terminals A, B so that the voltage at the second terminal B is maintained at the same level (vector) as before the occurrence of the fault.

Third Embodiment

Figure 5:
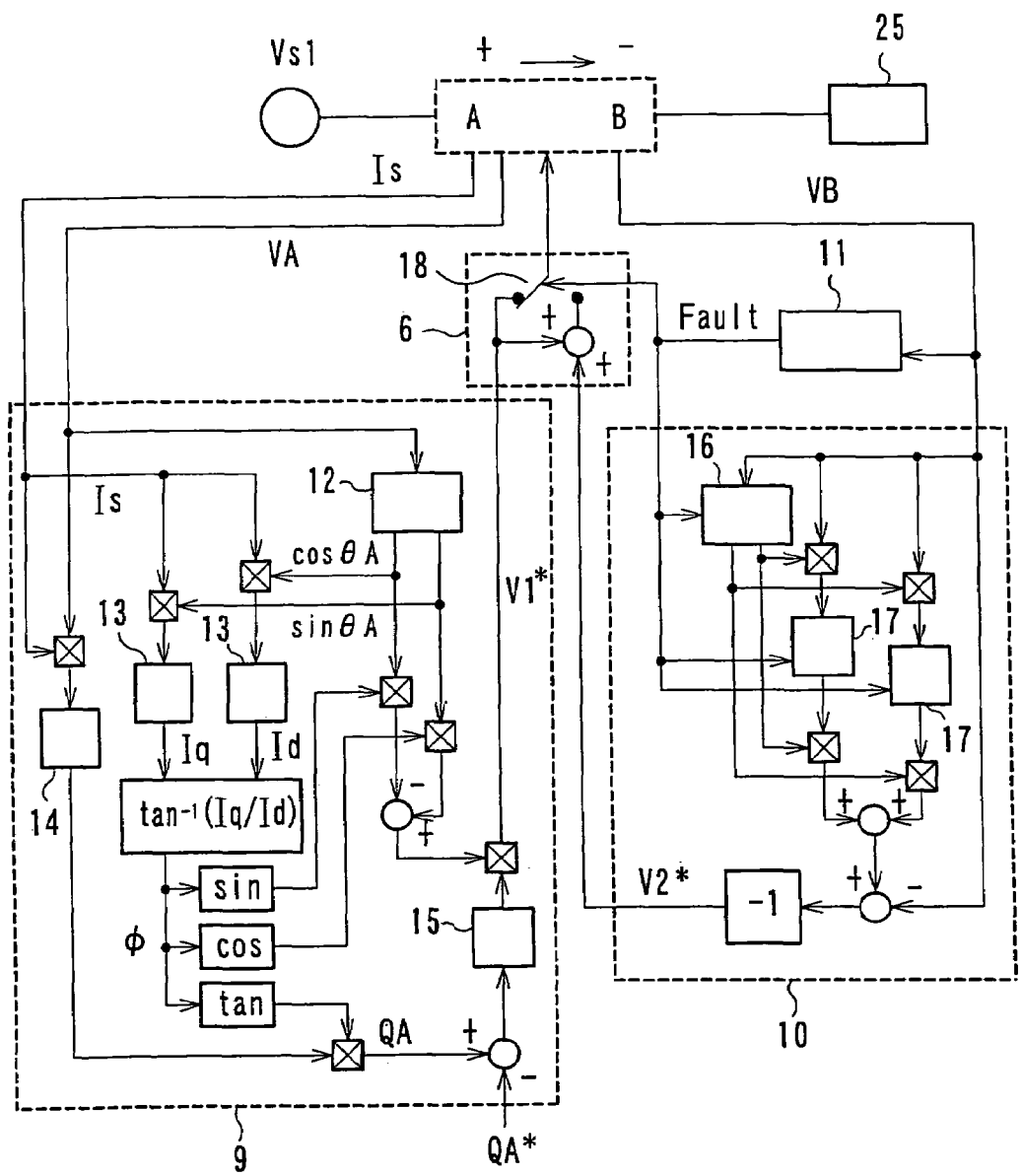
FIG. 5 is a block diagram of a multimode static series compensator according to a third embodiment of the invention.

FIG. 5 is a block diagram of a multimode static series compensator according to a third embodiment of the invention.

This multimode static series compensator also has a first terminal A connected to an ac power supply Vs1 and a second terminal B connected to a load 25. Electric power is supplied from the ac power supply Vs1 to the load 25 through the multimode static series compensator.

Figure 6A:
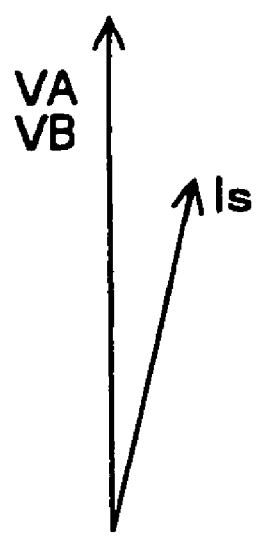
FIGS. 6A, 6B, 6C and 6D are diagrams showing voltage and current vectors depicting the operation of the multimode static series compensator of FIG. 5.

FIG. 6A is a vector diagram showing a state in which the multimode static series compensator operates while producing zero voltage. Since the multimode static series compensator outputs zero voltage in this state, a vector representing voltage VA at the first terminal A is identical to a vector representing voltage VB at the second terminal B and current Is has a phase difference corresponding to the power factor of the load 25 with respect to the voltage.

Figure 6B:
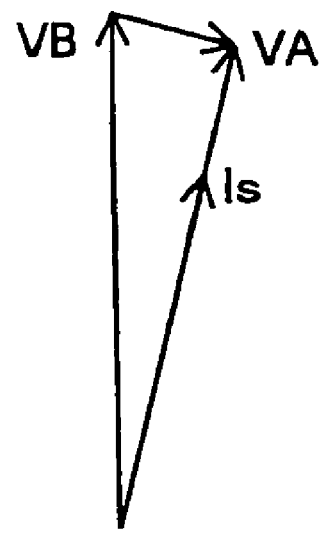

FIG. 6B is a vector diagram showing a state in which the multimode static series compensator applies a voltage delayed by 90 electrical degrees with reference to the current Is flowing through the second terminal B in the state of FIG. 6A. Since the relationship between the phases of the voltage and the current at the second terminal B shown in FIG. 6B is same as that shown in FIG. 6A, the multimode static series compensator can correct the voltage at the first terminal A by applying the voltage to the first terminal A and thereby improve the power factor as viewed from the power supply Vs1 as a result of a decrease in phase difference between the voltage and current at the first terminal A. The voltage corrected by the multimode static series compensator is the difference between the voltage VA and the voltage VB.

Figure 6C:
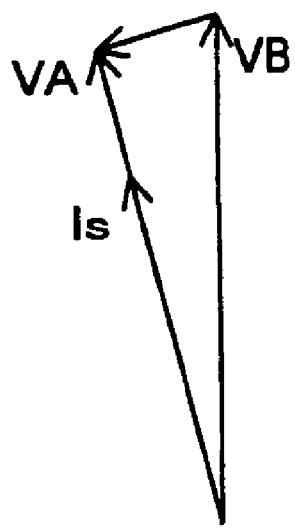

If the power factor of the load 25 is a leading power factor, the power factor on the power supply side is improved as in a case where the power factor of the load 25 is a lagging power factor when the multimode static series compensator applied a voltage leading the current Is. FIG. 6C is a vector diagram showing this state, in which the difference between the voltage VA and the voltage VB corresponds to the voltage corrected by the multimode static series compensator as is the case with the state of FIG. 6B.

A steady-state controller 9 of FIG. 5 represents an example of the configuration of a controller capable of executing the aforementioned operation of the multimode static series compensator. The voltage VA at the first terminal A detected by a voltage sensor 3 is input into a phase-locked loop 12. The phase-locked loop 12 detects a phase θA synchronized with the voltage VA and outputs sine and cosine components of the phase θA. In this embodiment, an offset point is selected such that zero points of the cosine wave of the phase θA synchronize with zero points of the voltage VA.

After multiplying the sine and cosine of the phase θA by the value of a current flowing from the first terminal A to the second terminal B of the multimode static series compensator detected by a current sensor 5, the steady-state controller 9 calculates a sine component Iq and a cosine component Id of the current Is by means of low-pass filters 13. Next, the steady-state controller 9 calculates a phase difference φ of the current with respect to the phase θA from the sine component Iq and the cosine component Id of the current Is. Further, the steady-state controller 9 calculates the sine of θA−φ from the sine and cosine of the phase difference φ and the sine and cosine of the phase θA by performing a mathematical operation expressed by $\sin(\theta A-\phi)=\sin(\theta A)\cos(\phi)-\cos(\theta A)\sin(\phi)$ by means of multipliers and an adder.

Derived from this mathematical operation is a reference signal $\sin(\theta A-\phi)$ which lags the current Is by 90 electrical degrees. After multiplying the detected voltage VA by the current Is by a multiplier, the steady-state controller 9 detects active power PA flowing through the first terminal A by means of a low-pass filter 14. Further, the steady-state controller 9 calculates reactive power QA flowing through the first terminal A by multiplying the active power PA by the tangent of the phase difference φ by means of a multiplier. The steady-state controller 9 calculates a deviation of the reactive power QA from a reactive power command QA* by a subtracter and amplifies the deviation by means of a compensator 15. Then, the steady-state controller 9 generates a first voltage command V1* by multiplying the amplified deviation by the reference signal $\sin(\theta A-\phi)$ which lags the current Is by 90 electrical degrees by means of a multiplier.

If it is intended to improve the supply side power factor, the reactive power command QA* is set to 0, for instance. If the reactive power QA flowing through the first terminal A is lagging reactive power as shown in the vector diagram of FIG. 6B, the compensator 15 generates a positive compensation quantity and the multimode static series compensator applies a voltage for compensating for the lag of the current Is. If the reactive power QA flowing through the first terminal A is leading reactive power as shown in the vector diagram of FIG. 6C, on the contrary, the compensator 15 generates a negative compensation quantity and the multimode static series compensator applies a voltage for compensating for the lead of the current Is.

The multimode static series compensator can improve the power factor of the ac power supply Vs1 as the steady-state controller 9 operates in the aforementioned manner.

Figure 6D:
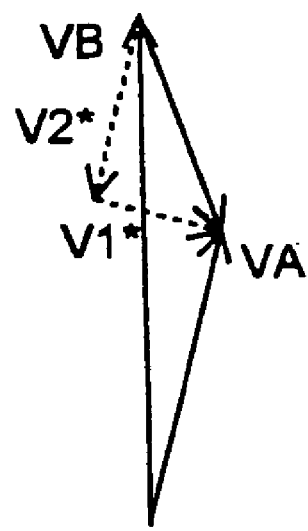

A transient controller 10 and a voltage command selector 6 are not described in any detail here since the configuration and working thereof are the same as discussed in the foregoing second embodiment. FIG. 6D is a vector diagram showing a state in which the ac supply voltage has dropped. A second voltage command V2* output from the transient controller 10 compensates for the drop of the ac supply voltage while the first voltage command V1* output from the steady-state controller 9 maintains the voltage which has been compensated for before the occurrence of the voltage drop. Consequently, the multimode static series compensator works to maintain the voltage at the second terminal B at the same level as before the occurrence of the fault, thereby supplying a high-quality voltage to the load 25.

Fourth Embodiment

Figure 7:
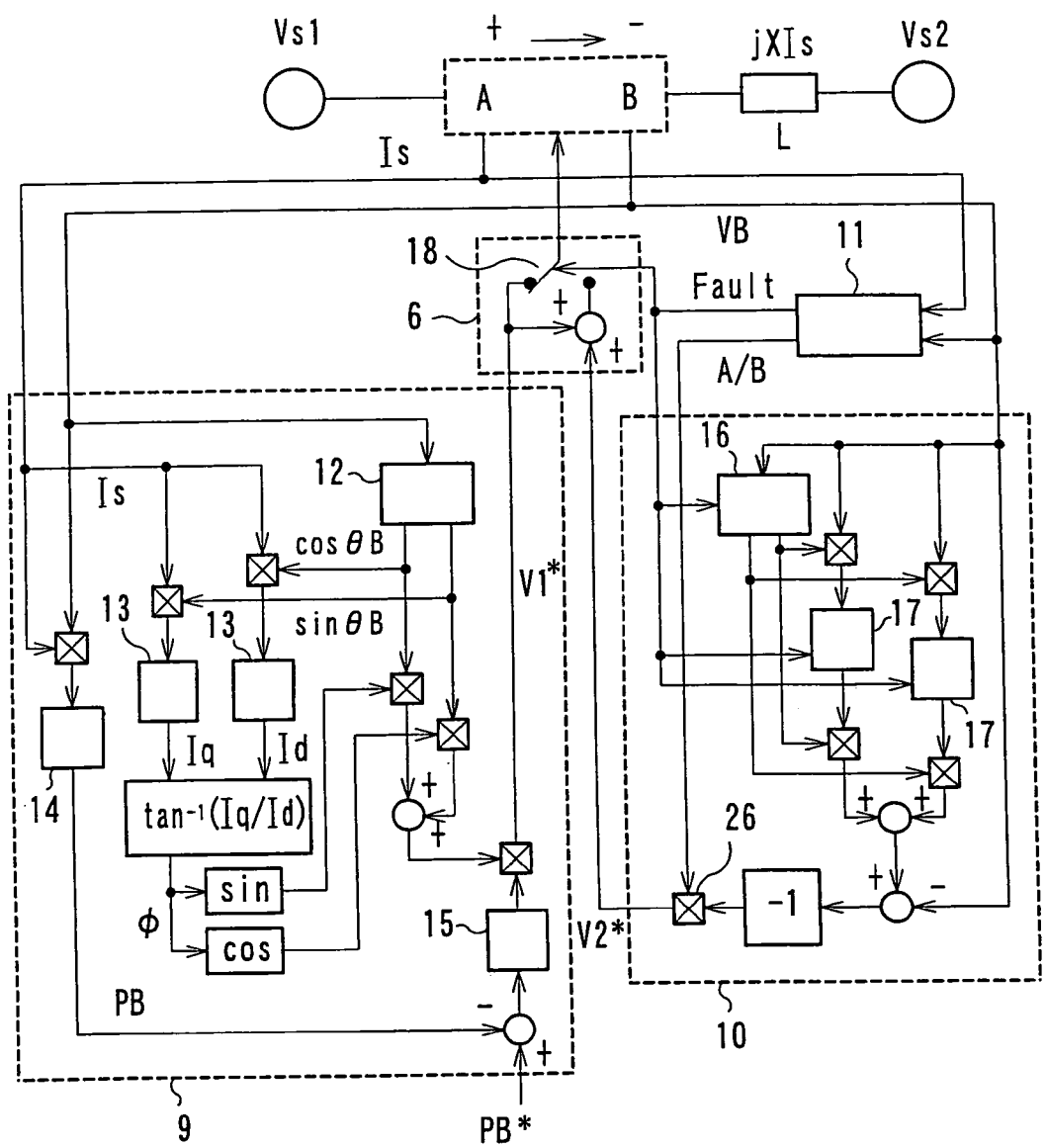
FIG. 7 is a block diagram of a multimode static series compensator according to a fourth embodiment of the invention.

FIG. 7 is a block diagram of a multimode static series compensator according to a fourth embodiment of the invention.

This multimode static series compensator is configured such that the same is connected between two ac power supplies Vs1, Vs2 (first and second power supplies) and injects a voltage therebetween. Referring to FIG. 7, there exists impedance X of a transmission line and a transformer, for instance, between the multimode static series compensator and the ac power supply Vs2. While the impedance X exists between the multimode static series compensator and the ac power supply Vs2 alone as illustrated in FIG. 7, the following discussion applies, in principle, even when similar impedance also exists between the multimode static series compensator and the ac power supply Vs1.

The configuration of a steady-state controller 9 of this multimode static series compensator and the operation performed thereby for controlling power flow by applying a voltage which lags or leads current Is by 90 electrical degrees are the same as discussed in the foregoing second embodiment, so that the configuration of operation of the steady-state controller 9 are not described in any detail here.

Now, a transient controller 10 of this embodiment is described. The configuration and operation of a portion of the transient controller 10 for calculating a voltage deviation from detected voltage VB are not described in any detail here since the configuration and operation of that portion of the transient controller 10 are the same as discussed in the foregoing second embodiment. The operation of the transient controller 10 for switching voltage commands according to a signal (fault signal of FIG. 7) output based on the detected voltage VB indicating the occurrence of a fault is not described either since this operation is also the same as discussed in the second embodiment.

In the multimode static series compensator of FIG. 7, a fault sensing circuit 11 generates a fault location signal A/B indicating whether a fault has occurred on the side of a first terminal A or a second terminal B.

Figure 8A:
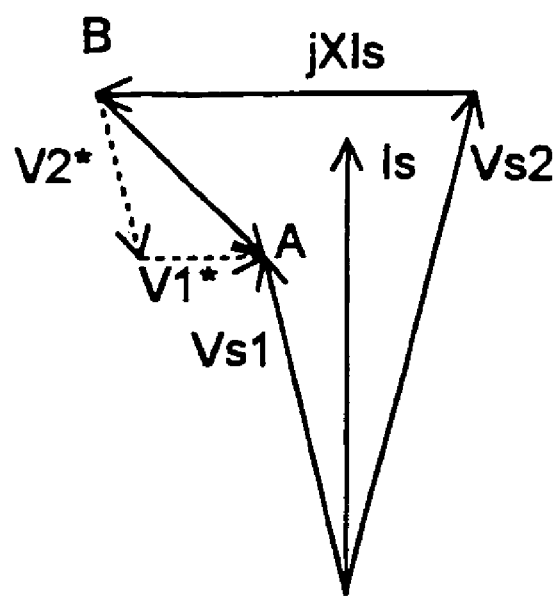
FIGS. 8A and 8B are diagrams showing voltage and current vectors depicting the operation of the multimode static series compensator of FIG. 7.

When a fault occurs on the side of the first terminal A, the fault location signal A/B is set to a value "1". When a fault occurs on the side of the second terminal B, on the other hand, the fault location signal A/B is set to a value "−1". The voltage deviation is reversed in polarity by multiplying the same by −1 and a resultant reversed polarity voltage deviation signal is input into a polarity reversing circuit 26. The polarity reversing circuit 26 calculates a second voltage command V2* by multiplying the reversed polarity voltage deviation signal by the fault location signal A/B. Thus, operation performed by the multimode static series compensator to cope with the fault occurring on the side of the first terminal A is the same as that of the second embodiment as illustrated by a vector diagram of FIG. 8A.

Figure 8B:
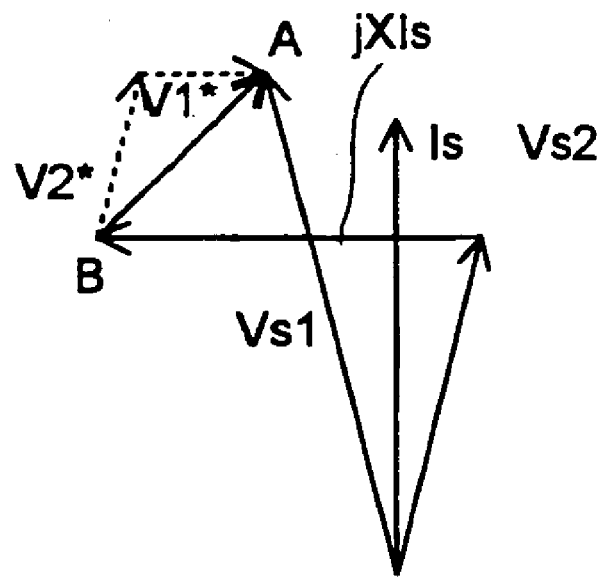

When a fault occurs on the side of the second terminal B, the fault location signal A/B becomes "−1" so that the polarity of the second voltage command V2* output from the polarity reversing circuit 26 to the voltage command selector 6 becomes same as the polarity of the voltage deviation output from the subtracter in a preceding stage. Operation performed in this case is explained with reference to a vector diagram of FIG. 8B. When the voltage deviation occurs as a result of a voltage drop on the side of the second terminal B, the second voltage command V2* as well as a first voltage command V1* produced by the steady-state controller 9 are applied between the first and second terminals A, B, whereby the voltage at the first terminal A is maintained at the same level (vector) as before the occurrence of the fault. Consequently, the voltage at the second terminal B drops by as much as the voltage deviation so that the voltage applied across the impedance X is maintained at the same level and the current Is remains the same as before the occurrence of the fault. Since the current Is is maintained at the same value as before the occurrence of a fault occurring on the side of the first terminal A as well, the multimode static series compensator of this embodiment can also function as an overcurrent suppressor in the event of a power system fault.

Fifth Embodiment

Figure 9:
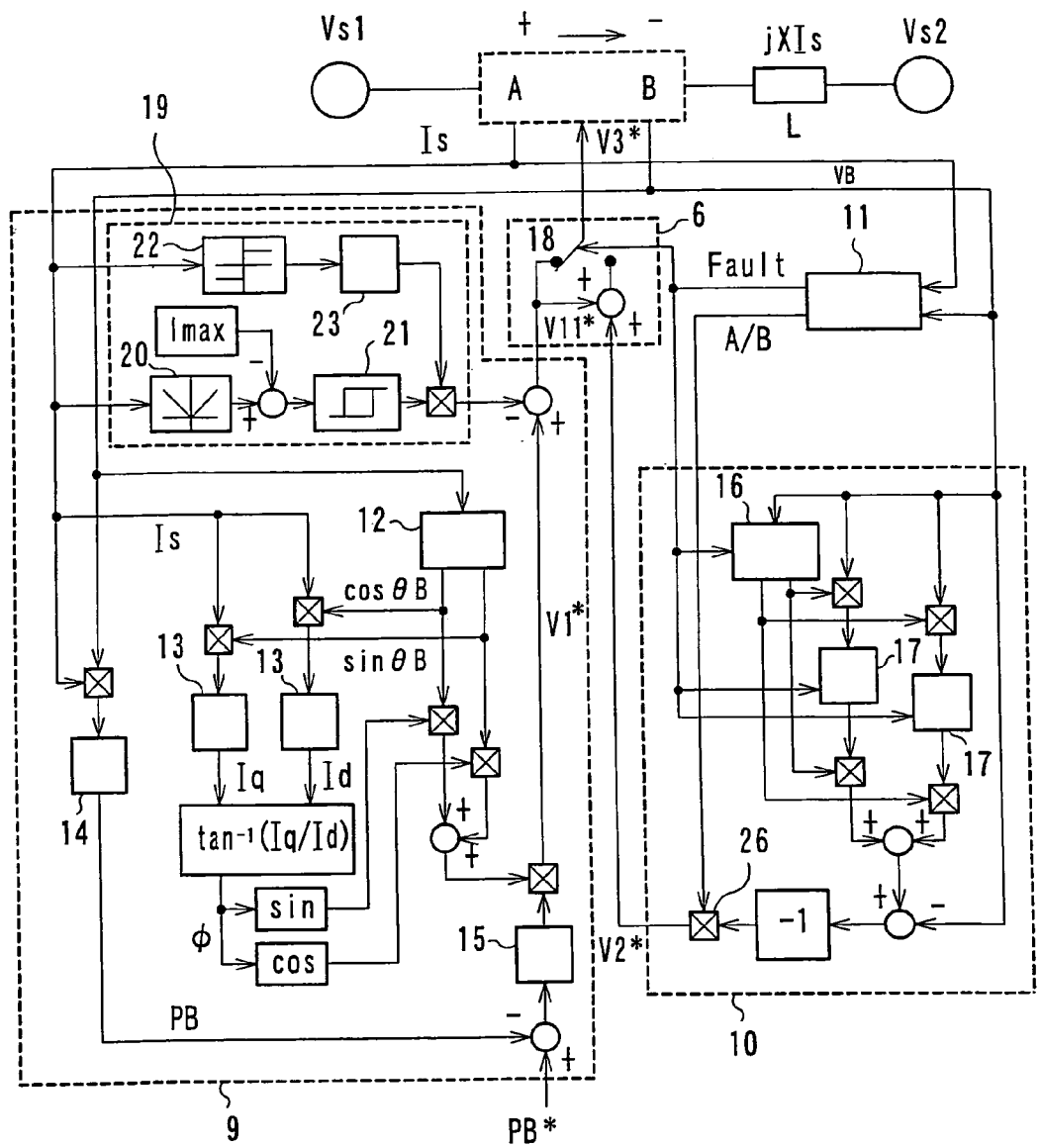
FIG. 9 is a block diagram of a multimode static series compensator according to a fifth embodiment of the invention.

FIG. 9 is a block diagram of a multimode static series compensator according to a fifth embodiment of the invention.

The basic configuration of a steady-state controller 9 of this multimode static series compensator and the operation performed thereby for controlling power flow by applying a voltage which lags or leads current Is by 90 electrical degrees are the same as discussed in the foregoing fourth embodiment, so that the basic configuration and operation of the steady-state controller 9 are not described in any detail here. The configuration and operation of a transient controller 10 are also the same as discussed in the foregoing fourth embodiment, so that the configuration and operation of the transient controller 10 are not described here either.

A current limitation control circuit 19 additionally provided in the steady-state controller 9 of this multimode static series compensator is described below. In the current limitation control circuit 19, a detected value of a current flowing from a first terminal A to a second terminal B is input into an absolute value circuit 20, which calculates the absolute value of the detected current value. A subtracter subtracts a current limitation command value Imax from the absolute value of the detected current value and delivers the result to a hysteresis circuit 21. When this input from the subtracter is larger than a specified positive value, the hysteresis circuit 21 outputs a value "1". When the input from the subtracter is equal to or smaller than a specified negative value, on the other hand, the hysteresis circuit 21 outputs a value "0".

Therefore, when the detected current value exceeds the current limitation command Imax and becomes larger than the current limitation command Imax of the hysteresis circuit 21 by as much as the specified positive value, the output of the hysteresis circuit 21 becomes "1". The aforementioned detected current value is also input into a polarity sensing circuit 22, which outputs "1" when the detected current value is positive, "−1" when the detected current value is negative, and "0" when the detected current value is zero. The output of the polarity sensing circuit 22 is amplified by a positive gain circuit 23 and the amplified output of the polarity sensing circuit 22 is multiplied by the output of the hysteresis circuit 21 by a multiplier.

An output of the aforementioned multiplier is subtracted from a first voltage command V1* generated by the basic configuration of the steady-state controller 9 by a subtracter, which delivers a voltage command V11* to a voltage command selector 6. When the current Is increases to a positive side and exceeds a specific level, for example, the output of the hysteresis circuit 21 changes from "0" to "1" and the polarity sensing circuit 22 outputs "1" so that the value of the voltage command V11* decreases. As a result, the voltage at the first terminal A decreases and a voltage applied across an impedance X disposed in an ac power line is decreased so that the current Is decreases. When the current Is increases to a negative side, on the other hand, the output of the hysteresis circuit 21 changes from "0" to "1" and the polarity sensing circuit 22 outputs "−1" so that the voltage at the first terminal A increases.

The multimode static series compensator operates in a manner described above, making it possible to limit the current flowing in the power system.

Figure 10:
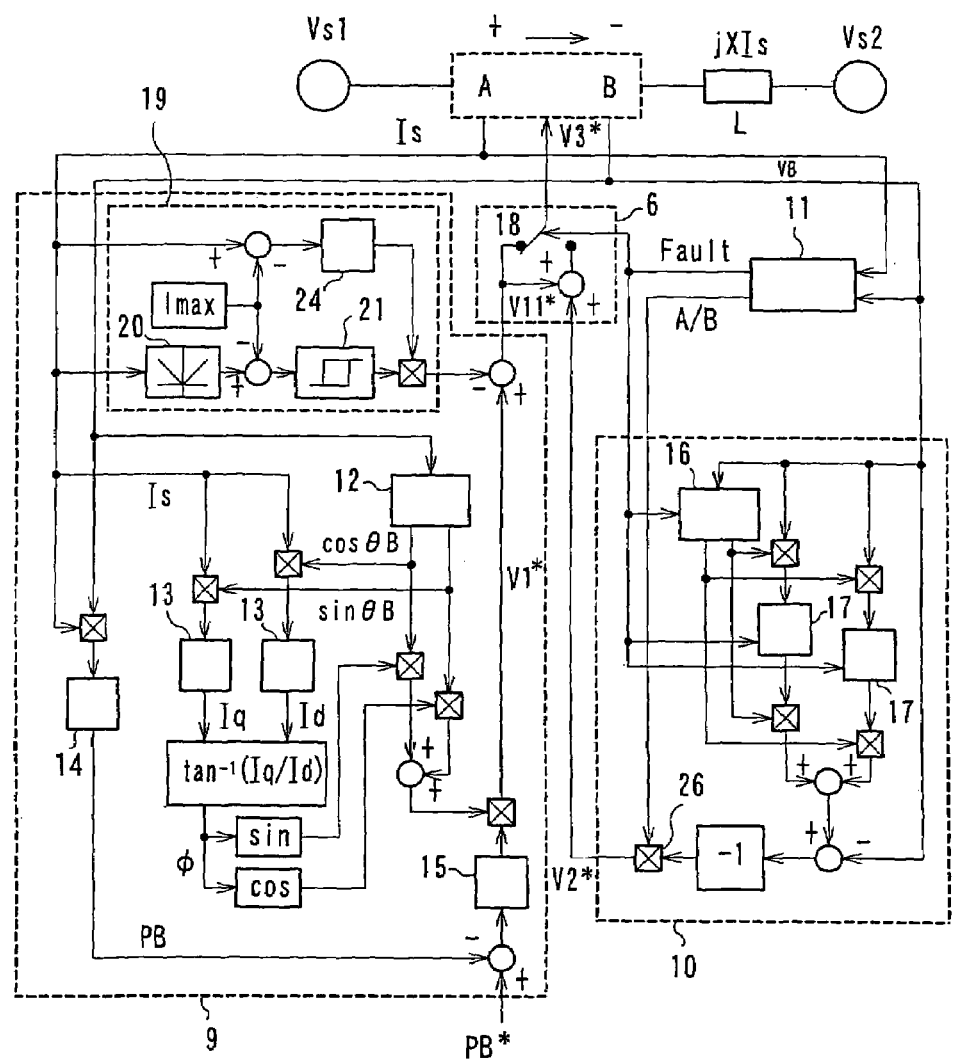
FIG. 10 is a block diagram of a multimode static series compensator according to a variation of the fifth embodiment of FIG. 9.

The multimode static series compensator of the fifth embodiment shown in FIG. 9 employs an arrangement for amplifying the output of the polarity sensing circuit 22 by means of the positive gain circuit 23 to obtain a voltage for compensating for an overcurrent as discussed above. In one variation of the embodiment, the multimode static series compensator may employ an arrangement shown in FIG. 10, in which a subtracter calculates a difference of the detected current value from the current limitation command Imax and a gain circuit 24 amplifies this difference according to the magnitude of an overcurrent.

Sixth Embodiment

Figure 11A:
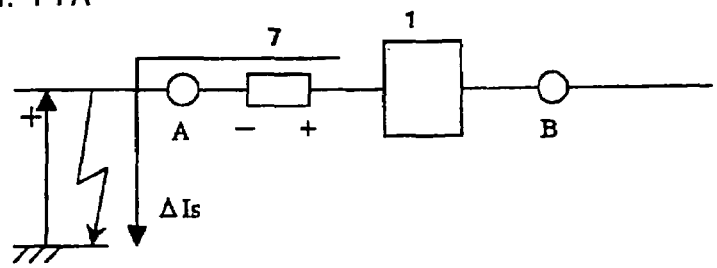
FIGS. 11A, 11B, 11C and 11D are diagrams showing the operating principle of a fault sensing circuit.
Figure 11B:
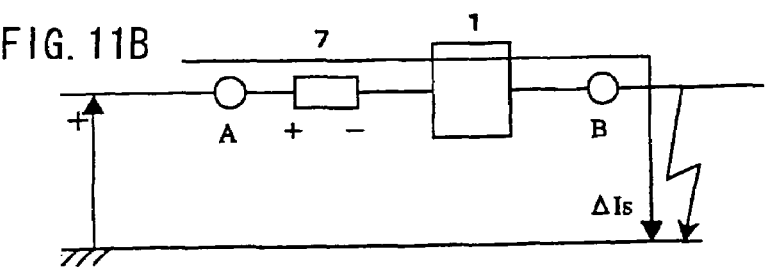
Figure 11C:
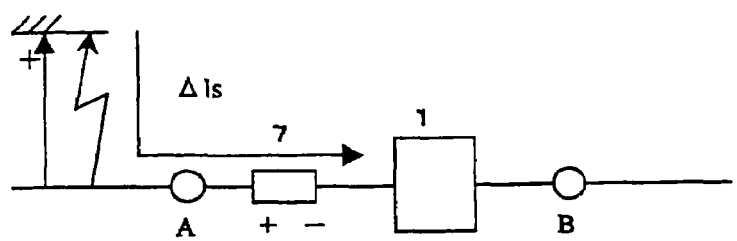
Figure 11D:
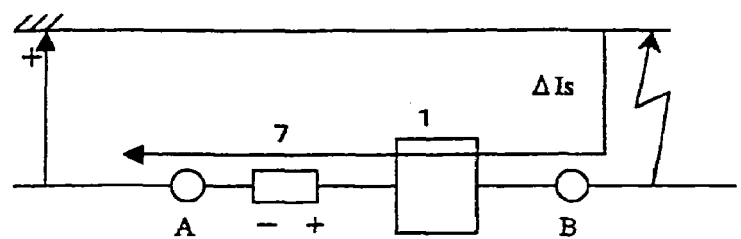

Specific examples of the working of the fault sensing circuit 11 used in the foregoing individual embodiments are described with reference to FIGS. 11A, 11B, 11C and 11D, of which FIGS. 11A and 11B show how the fault sensing circuit 11 operates when the voltage applied to the first terminal A is positive while FIGS. 11C and 11D show how the fault sensing circuit 11 operates when the voltage applied to the first terminal A is negative.

The power conversion circuit 1 and the fault sensing inductance 7 serving as a current change rate sensor are inserted between the first and second terminals A, B.

If a fault occurs on the side of the first terminal A as illustrated in FIG. 11A, a fault current corresponding to a change ΔIs in load current increases in a direction shown by an arrow and, as a result, a voltage having a polarity shown in FIG. 11A is induced across the fault sensing inductance 7.

Here, it is assumed that the induced voltage has a larger value than normal because the fault current has a larger current change rate than that of an ordinary power line current. It is therefore possible to judge that a fault has occurred when an induced voltage having a level much higher than observed under non-fault conditions is detected.

If a fault occurs on the side of the second terminal B as illustrated in FIG. 11B, on the other hand, a fault current ΔIs increases in a direction shown by an arrow and, as a result, a voltage having a polarity shown in FIG. 11B is induced across the fault sensing inductance 7. This polarity of the induced voltage differs from the polarity of the voltage induced when the fault occurs on the side of the first terminal A. Therefore, upon detecting the occurrence of a fault based on observation of the voltage induced across the fault sensing inductance 7 exceeding a specific reference voltage, it is possible to judge whether the fault has occurred on the side of the first terminal A or the second terminal B based on information on the polarity of the voltage induced across the fault sensing inductance 7.

If a fault occurs on the side of the first terminal A as illustrated in FIG. 11C, a fault current ΔIs increases in a direction shown by an arrow and, as a result, a voltage having a polarity shown in FIG. 11C is induced across the fault sensing inductance 7.

If a fault occurs on the side of the second terminal B as illustrated in FIG. 1D, on the other hand, a fault current ΔIs increases in a direction shown by an arrow and, as a result, a voltage having a polarity shown in FIG. 11D is induced across the fault sensing inductance 7. This polarity of the induced voltage differs from the polarity of the voltage induced when the fault occurs on the side of the first terminal A. Therefore, upon detecting the occurrence of a fault based on observation of the voltage induced across the fault sensing inductance 7 exceeding a specific reference voltage, it is possible to judge whether the fault has occurred on the side of the first terminal A or the second terminal B based on information on the polarity of the voltage induced across the fault sensing inductance 7.

It is obvious from a comparison between situations illustrated in FIGS. 11A, 11B and FIGS. 11C, 11D that the relation between the polarity of the voltage induced across the fault sensing inductance 7 and the fault side (terminal A or B side) is reversed between FIGS. 11A, 11B and FIG. 11C. It is understood from the foregoing that the fault sensing circuit 11 can determine the location of a fault if three pieces of information, that is, the polarity of the voltage applied to the first terminal A, the magnitude and polarity of the voltage induced across the fault sensing inductance 7, are available.

Needless to say, the polarity of the voltage applied to the second terminal B may be input into the fault sensing circuit 11 instead of the polarity of the voltage applied to the first terminal A to enable the fault sensing circuit 11 to locate the fault. It is also possible to indirectly obtain the voltage induced across the fault sensing inductance 7 by calculating from the voltage at the first terminal A detected by the first voltage sensor 3, the voltage at the second terminal. B detected by the second voltage sensor 4 and the output voltage of the power conversion circuit 1.

Furthermore, the method earlier described with reference to the second embodiment may be used for judging whether any fault has occurred. In addition, it is obvious that the fault sensing circuit 11 can judge whether a fault has occurred on the side of the first terminal A or the second terminal B by obtaining information on the polarity of the voltage induced across the fault sensing inductance 7 immediately after (or at the same time as) the location of the fault is determined.

While the voltage induced across the fault sensing inductance 7 which serves as a current change rate sensor is used for detecting the current change rate in the foregoing discussion, a current detector associated with a differentiation circuit for differentiating an output of the current detector may be inserted between the first and second terminals A, B instead of the fault sensing inductance 7 so that an output of the differentiation circuit can be used for detecting the current change rate.

Seventh Embodiment

While the multimode static series compensator of the fifth embodiment has been described as being structured such that the ac power supplies Vs1, Vs2 are connected to the first and second terminals A, B, respectively, as illustrated in FIG. 9, a load may be connected, instead of the ac power supply Vs2, to the second terminal B as in the third embodiment illustrated in FIG. 5, since the fault sensing circuit 11 can determine whether an abnormal voltage has occurred on the side of the first terminal A or the second terminal B. When a short circuit of a load occurs or when a load transformer is connected (turned on), for instance, an overcurrent or an inrush current normally flows. The overcurrent and the inrush current can be limited to a level not exceeding a specific level by the aforementioned arrangement of the fifth embodiment.

In each of the embodiments thus far described, the aforementioned first controller (steady-state controller 9) includes an active power detecting circuit for determining the value of active power by multiplying the output of the first voltage sensor 3 or the second voltage sensor 4 by the output of the current sensor 5 and an active power control circuit for outputting the first voltage command (V1*) for generating reactive power such that a deviation of the detected active power value from an active power command (PB*) input into the active power control circuit becomes zero. With the first controller thus configured, the power converter of the invention serves a function of controlling the active power to a constant level under steady-state operating conditions in which no anomaly exists in the power system. Under transient conditions following the occurrence of an anomaly in the power system, on the other hand, the power converter serves the function of controlling the active power to a constant level as well as a function of suppressing voltage fluctuations at a point where the voltage should be compensated for, so that a single multimode static series compensator of the invention can perform both functions at low cost and low energy losses.

In one feature of the invention, the first controller (steady-state controller 9) includes a reactive power detecting circuit for determining the value of reactive power by multiplying the output of the first voltage sensor 3 or the second voltage sensor 4 by the output of the current sensor 5 and a power factor control circuit for outputting the first voltage command (V1*) for generating reactive power such that a deviation of the detected reactive power value from a reactive power command (QA*) input into the power factor control circuit becomes zero, the reactive power command (QA*) being set based on a target power factor. With the first controller thus configured, the power converter of the invention serves a function of controlling the power factor to a constant level under steady-state operating conditions in which no anomaly exists in the power system. Under transient conditions following the occurrence of an anomaly in the power system, on the other hand, the power converter serves the function of controlling the power factor to a constant level as well as a function of suppressing voltage fluctuations at a point where the voltage should be compensated for, so that a single multimode static series compensator of the invention can perform both functions at low cost and low energy losses.

In another feature of the invention, the aforementioned fault sensor (fault sensing circuit 11) outputs a fault signal including information on the presence or absence of any voltage fluctuation fault and information on whether the fault has occurred on the side of the first terminal A or the second terminal B, and the aforementioned second controller (transient controller 10) includes a voltage command polarity reversing circuit for reversing the polarity of the second voltage command (V2*) which is output in response to the fault signal such that the voltage detected by the voltage sensor connected to one of the first and second terminals A, B on which no fault is detected maintains the same level as before the occurrence of the fault when the fault sensor has output the fault signal. With this arrangement, the multimode static series compensator can perform the voltage fluctuation suppression function in a more positive fashion when an anomaly occurs in the power system.

In still another feature of the invention, the current change rate sensor (fault sensing inductance 7) is inserted between the first and second terminals A, B in series with output terminals of the power conversion circuit 1, and the aforementioned fault sensor (fault sensing circuit 11) outputs the fault signal according to the polarity of the voltage detected by the first or second voltage sensor 3, 4 and the magnitude and polarity of an output of the current change rate sensor. This arrangement makes it possible to determine the location of the fault in a reliable fashion.

In yet another feature of the invention, the aforementioned first controller (steady-state controller 9) includes a current limitation control circuit 19 for adding or subtracting a voltage limitation amount to or from the first voltage command (V1*) depending on the polarity of a detected current value such that the absolute value of the detected current value decreases when this absolute value exceeds a specified value. This arrangement serves to suppress an overcurrent occurring in the event of a fault in a reliable fashion.

In a case where the multimode static series compensator is used for interconnecting first and second power supplies, the first terminal A is connected to the first power supply while the second terminal B is connected to the second power supply. In this case, the multimode static series compensator can control power flow between the two power supplies under normal operating conditions and can compensate for voltage fluctuations while controlling the power flow in the event of a line disturbance.

In a case where the multimode static series compensator is used for connecting a power supply to a load to which electric power is supplied from the power supply, the first terminal A is connected to the power supply while the second terminal B is connected to the load. In this case, the multimode static series compensator serves to provide a high-quality voltage to the load not only under normal operating conditions but also during line disturbances.

What is claimed is:

1. A power converter comprising:
   first and second terminals connected in series with a power line of a power system;
   a power conversion circuit for outputting a voltage applied between said first and second terminals by converting power fed from an energy storage circuit;
   first and second voltage sensors for detecting voltages at said first and second terminals, respectively;
   a current sensor for detecting a current flowing from said first terminal to said second terminal;
   a fault sensor for detecting the presence or absence of any voltage fluctuation fault at either of said first and second terminals based on sensing signals of said first and second voltage sensors and said current sensor;
   a first controller for outputting a first voltage command for controlling the output voltage of said power conversion circuit such that a detected power value calculated from the sensing signals of said first and second voltage sensors and said current sensor matches a specific power command;
   a second controller for outputting a second voltage command for controlling the output voltage of said power conversion circuit such that the voltage detected by one of said first and second voltage sensors remains the same as before the occurrence of a fault if said fault sensor detects the presence of the fault; and
   a voltage command selector for switching the voltage command to be output to said power conversion circuit in such a way that the first voltage command is output to said power conversion circuit if said fault sensor detects the absence of the fault and the sum of the first and second voltage commands is output to said power conversion circuit if said fault sensor detects the presence of the fault.

2. The power converter according to claim 1, wherein said first controller includes:
   an active power detecting circuit for determining the value of active power by multiplying the sensing signal of one of said first and second voltage sensors by the sensing signal of said current sensor; and
   an active power control circuit for outputting the first voltage command for generating reactive power such that a deviation of the detected active power value from an active power command input into said active power control circuit becomes zero.

3. The power converter according to claim 1, wherein said first controller includes:
   a reactive power detecting circuit for determining the value of reactive power by multiplying the sensing signal of one of said first and second voltage sensors by the sensing signal of said current sensor; and
   a power factor control circuit for outputting the first voltage command for generating reactive power such that a deviation of the detected reactive power value from a reactive power command input into said power factor control circuit becomes zero, the reactive power command being set based on a target power factor.

4. The power converter according to claim 1, wherein said fault sensor outputs a fault signal including information on the presence or absence of any voltage fluctuation fault and information on whether the fault has occurred on the side of said first or second terminal; and
   wherein said second controller includes a voltage command polarity reversing circuit for reversing the polarity of the second voltage command which is output in response to the fault signal such that the voltage detected by the voltage sensor connected to one of said first and second terminals on which no fault is detected maintains the same level as before the occurrence of the fault when said fault sensor has output the fault signal.

5. The power converter according to claim 4, wherein a current change rate sensor is inserted between the first and second terminals in series with output terminals of said power conversion circuit; and wherein said fault sensor outputs the fault signal according to the polarity of the voltage detected by one of said first and second voltage sensors and the magnitude and polarity of an output of said current change rate sensor.

6. The power converter according to claim 1, wherein said first controller includes a current limitation control circuit for adding or subtracting a voltage limitation amount to or from the first voltage command depending on the polarity of the value of the current detected by said current sensor such that the absolute value of the detected current value decreases when this absolute value exceeds a specified value.

7. The power converter according to claim 1, wherein said power converter interconnects first and second power supplies with said first terminal connected to the first power supply and said second terminal connected to the second power supply.

8. The power converter according to claim 1, wherein said power converter connects a power supply to a load to which electric power is supplied from the power supply with said first terminal connected to the power supply and said second terminal connected to the load.

* * * * *